April 14, 1942.  W. LANCASTER  2,279,625
VIBRATION DAMPING TIE WIRE
Filed Sept. 13, 1940
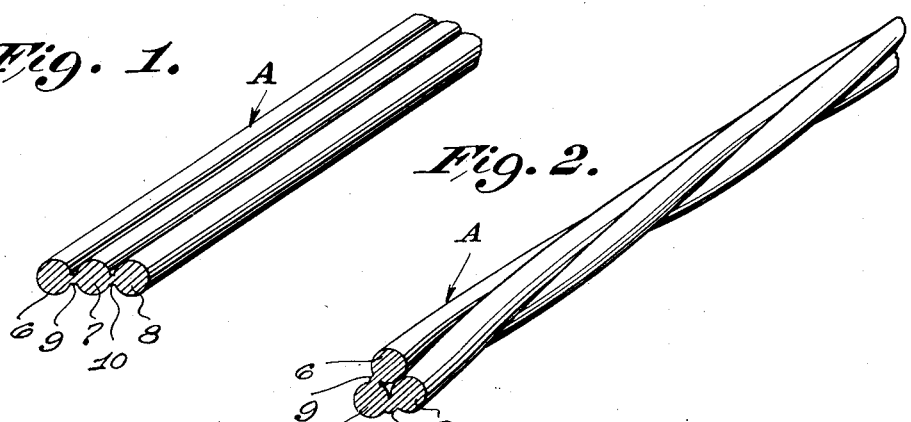
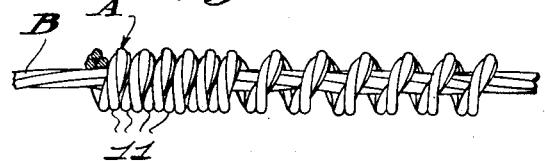
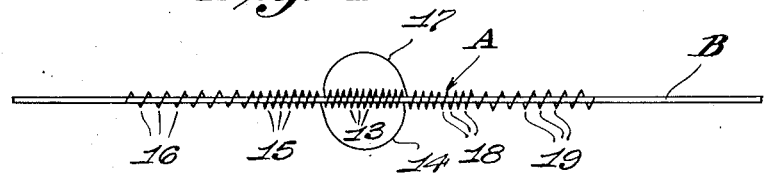
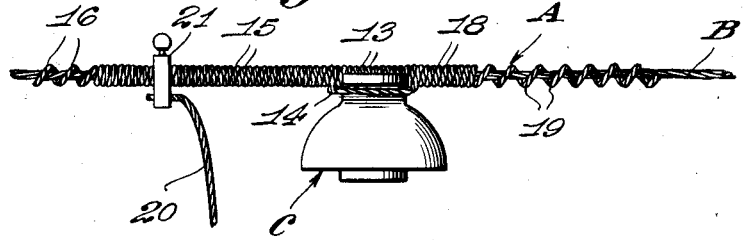
Inventor
William Lancaster
By James P. Burns
Attorney Patented Apr. 14, 1942

2,279,625

UNITED STATES PATENT OFFICE 2,279,625

VIBRATION DAMPING TIE WIRE

William Lancaster, Alexandria, Va.

Application September 13, 1940, Serial No. 356,688

8 Claims. (Cl. 174—42)

My invention relates to an apparatus for tieing and reinforcing overhead wires and cables and for minimizing the damage to such wires and cables caused by vibration.

When wires or cables such as electrical conductors and the like are supported above ground in long spans, under tension, they are inevitably subject to vibration. This vibration is apparently caused by wind blowing against and across the conductors or the like, which sets up vibration of a frequency corresponding to some natural frequency of vibration of the span of wire. The wire must be supported between spans by stationary or relatively stationary supports and for that reason, the wire adjacent the stationary supports is subjected to frequently repeated bending stresses which have often been found to ultimately result in fatigue failure of the wire. An important and typical example of wires which are subject to damage by these vibrations is found in electric conductors for power or communication systems. Observations have shown that the frequency of vibration of electric conductors caused by the wind sometimes exceeds 200 cycles per second. The amplitude of vibration is usually found to be small. The failure of wires near their points of support, due to these vibrations, has become known as "vibration fatigue."

Considerable study has been given to the problem of eliminating vibration fatigue and some progress has been made toward a solution of this problem. One attempt to solve this problem involves reinforcing the cable or wire at the point of support and for a short distance on each side of the point of support by means of a plurality of short wires or rods which are spirally wrapped about the cable and clamped thereto. An example of this method of reinforcing wires or cables is found in United States Patent No. 1,639,820, issued August 23, 1927, to Theodore Varney. This method has been found to be fairly satisfactory in preventing fatigue failure of cables or wires, but the expense of the plurality of short rods or wires and the clamps, together with the necessity of an independent tie wire to attach the reinforced section to the support when employing the conventional method of stringing wires and cables, also the labor cost of assembling the reinforcement and tie on the wire or cable, have been factors which have prevented wide-spread adoption of this method, particularly in low-cost rural electrification systems.

Another attempt to solve this problem has involved a method of wrapping the wire or cable with a single strand of wire in closely spaced helical turns about the cable at the point of support and for short distances on each side of the supports. While this method is relatively inexpensive, it has been found that it does not efficiently serve its primary purpose of preventing fatigue failure of the wire or cable.

It is a primary object of my invention to provide a combination tie wire that will also serve the purpose of wire or cable reinforcement having vibration damping characteristics which will overcome the objections of the two above-described methods without sacrificing the advantages of either method.

More specifically, my invention contemplates the provision of a unitary combined reinforcing vibration damping and tie device especially adapted for affixing metallic conductors and the like to spaced supports such as insulators, clamps, and other appurtenances conventionally employed in stringing electrical conductors.

Another important object of my invention is to provide a wire or cable reinforcement having efficient vibration damping properties and which can be used for securing the wire or cable to its support.

A further object of my invention is to provide a reinforcement for the wire or cable so that the wire or cable will be protected against abrasion at the point of support.

Still another important object of my invention is to provide a wire or cable reinforcement having vibration damping properties which reinforcement will make efficient electrical contacts with the wire or cable so that an electric tap-off device may be clamped directly to the reinforcement, thereby overcoming damage or mechanical injury to the conductor when attachment is made directly thereto.

Other objects of my invention will be specifically referred to hereinafter or will be apparent to those skilled in this art.

In the accompanying drawing, I have shown by way of example, what I now believe to be the preferred form of my invention and this exemplary form of the invention will now be described in detail. In the drawing:

Figure 1 is a perspective view of a unitary strip of metal which is suitable for forming my combination tie wire and vibration damping reinforcement;

Figure 2 is a perspective view of the strip of metal shown in Figure 1, after the said strip has been twisted about its longitudinal axis;

Figure 3 is a fragmentary view of a multiplestrand electrical conductor, showing the preferred method of applying my vibration damping reinforcement thereto;

Figure 4 is a diagrammatic view showing an appropriate method of applying the combination tie wire and vibration damping reinforcement to a top tied wire or cable when it is desired that the reinforcement shall serve the additional purpose of protecting the wire or cable against abrasion at a point of support such as an insulator; and Figure 5 is a side elevation view of a wire or cable secured to an insulator by means of the combination tie and vibration damping reinforcement and showing an electric tap-off clamped to the reinforcement.

Referring again to the drawing and, more particularly, to Figure 1 thereof, the reference character A designates generally a unitary strip of metal. The strip A embraces a plurality of ribs 6, 7, and 8, which are united by means of integral webs 9 and 10. Figure 2 shows the strip A after it has been twisted about its longitudinal axis to form the member from which the combination tie wire and vibration damping reinforcement is made. After the strip A has been twisted into the form shown in Figure 2, it should be wrapped in closely spaced helical turns 11 about the wire or cable B which is subject to vibration.

I have found that the inherent damping properties of a single unitary strand of the configuration shown in Figure 2 is far greater than those of a solid wire and that, as a matter of fact, the vibration damping properties of my reinforcement compare favorably with the expensive and complex reinforcement involving a plurality of individual solid strands. In spite of its improved damping properties, my reinforcement can be produced inexpensively and can be easily and quickly applied to a wire or cable by a single workman. The strip A can be rolled or extruded through dies in the form shown in Figure 1 and then twisted in any conventional manner. I also contemplate that the strip A may be drawn or extruded through a suitable rotating die to form the reinforcement in the configuration and arrangement shown in Figure 2 in a single operation.

Although my invention is not limited thereto, I have shown in Figure 4 a method of wrapping the vibration damping reinforcement about the wire or cable B in order that the reinforcement may function to prevent abrasion of the conductor as well as to secure the wire or cable to a support, such as an insulator, by a so-called "top-tie," and by continuing the wrapped reinforcement beyond the point of support to effectively dampen the vibration of the conductor. While I have illustrated a "top-tie," it will be understood that the invention is equally well adapted as a "side-tie."

In Figure 4, the vibration damping reinforcement is again designated generally by the reference character A. As shown, the vibration damping reinforcement is wrapped in closely adjacent helical turns 13 beginning at the center of the figure and extending in both directions. After several of the closely adjacent turns 13 have been made about the wire or cable B, the purpose of which is to prevent abrasive injury to the conductor, a loop 14 is made about an insulator or the like with one end of the reinforcement which is then again wrapped in close helical turns 15 in reverse direction for a substantial distance and then in spaced helical turns 16 until the end of the reinforcement is reached. A second loop 17 is made about the insulator or the like with the opposite end of the reinforcement which is then closely wrapped in helical turns 18 and relatively spaced helical turns 19 are then made as shown at the right of Figure 4. The loops 14 and 17, if a "top-tie" is used, may be placed around the opposite retaining shoulders of a conventional insulator and the closely spaced helical turns 13 may rest within the supporting groove of such conventional insulator. This arrangement will be clearly understood by reference to Figure 5, wherein the same reference numerals are used, and which shows the wire or cable B secured to a conventional top insulator C by means of the combined reinforcing vibration damping and tie wire device A.

In making a "side-tie," the application of the reinforcement is the same as in making a "top-tie," except that both the loops 14 and 17 extend around the same side of the insulator instead of on opposite sides as illustrated in Figure 4.

In Figure 5, the closely spaced helical turns 15 are shown as extending a substantially distance from the insulator C. This arrangement is advisable when it is desired to secure an electrical tap-off connection to the wire or cable B. I have shown such an electrical tap-off, which is designated by the reference numeral 20, and which is secured to the closely-wrapped helical turns 14 by means of a clamp 21, which may be of any conventional or suitable form.

I desire it to be understood that the utility of my invention is not limited to the arrangement shown and described, since I contemplate that the vibration damping reinforcement may be wrapped in closely spaced helical turns about a wire or cable and the thus reinforced length of the wire or cable clamped to insulators or other supporting appurtenances that are conventionally used with either power or communication conductors.

When the reinforcement A is wrapped about a wire or cable B, it will contact the wire or cable at a large number of points and since the reinforcement is an integral unit, the points of contact all cooperate to provide an efficient electrical contact between the wire or cable and the reinforcement. This is an important advantage in those cases where an electrical tap-off is desirable, such as that designated by the reference numeral 20 in Figure 5, which is clamped to the reinforcement.

The reinforcement A should preferably be made of a soft, ductile metal of the same material as the conductor, so that the reinforcement will not itself cause mechanical injury to the wire or cable B. In addition to the vibration damping property of the reinforcement A, it will serve to prevent mechanical injury or abrasion to the wire or cable at the point of support or at the point where an electrical tap-off device is attached.

Where I have used the expression "a unitary cabled tie" or "a unitary cabled member," it is to be understood that I intend to define an elongated metallic cable-like structure comprised of integrally united ribs extending in helical paths therealong.

While I have shown and described a preferred form of my invention, I do not intend that my invention shall be thereby limited since it will be obvious that certain modifications and changes may be resorted to without departing from the invention as defined by the following claims.

I claim:

1. The combination with an aerial conductor and a support therefor of a tie wire and vibration dampener comprising a unitary strip of metal embracing a plurality of integrally united ribs extending in helical paths along the length of the strip, said strip being wrapped in closely spaced helical turns about the conductor in juxtaposition to the support therefor.

2. The combination with an aerial conductor and a support therefor of a vibration damping tie wire comprising a unitary strip of metal embracing a plurality of longitudinally extending integrally united ribs, said strip being twisted along its length and wrapped in closely spaced helical turns about the conductor in juxtaposition to the support therefor.

3. The combination with an electrical conductor and a support therefor of a reinforcing and vibration damping tie wire comprising a unitary strip of metal embracing longitudinally extending ribs laterally spaced from each other by means of integral webs, said strip being twisted along its length and wrapped in a plurality of closely spaced helical turns about the conductor adjacent the support therefor.

4. The combination with an aerial conductor and a support therefor of a unitary cabled tie wire comprising a unitary strip of metal embracing a plurality of integrally united ribs extending in helical paths along the length of the strip, said tie wire being wrapped in closely spaced helical turns about the conductor in juxtaposition to the support and extending around said support for securing the conductor thereto.

5. The combination with an overhead electrical conductor and a tap-off secured thereto, of a unitary cabled member of metal having high electrical conductivity, said cabled member embracing a plurality of integrally united ribs extending in helical paths along the length of said cabled member, said cabled member being tightly wrapped in closely spaced helical turns between the conductor and the tap-off to thus secure a contact of high electrical conductivity between said conductor and said unitary cabled member and to effect vibration damping at the point of tap-off.

6. A tie wire for power and communication conductors comprising a unitary metal member embracing longitudinally extending ribs connected by integral webs, said member being twisted along its length to form a unitary tie wire characterized in that it possesses, when wrapped in a plurality of closely spaced helical turns about an aerial conductor in juxtaposition to a point of support thereof, the characteristic of effectively absorbing and dissipating the energy of conductor vibration by offering torsional resistance to movement of the wrapped section of the conductor.

7. An aerial conductor reinforcing member having improved vibration damping characteristics comprising a unitary strip of metal embracing a plurality of elongated ribs united by means of integral webs, said ribs extending in helical paths along the length of said strip.

8. The method of producing an aerial conductor reinforcing member having vibration damping characteristics which comprises forming a metal strip embracing a plurality of longitudinally extending ribs laterally spaced from each other by integral webs and twisting said strip to cause said ribs to extend in helical paths along the length of said strip.

WILLIAM LANCASTER.